(Model.) 4 Sheets—Sheet 1.
W. N. GARTSIDE.
METHOD OF AND APPARATUS FOR MOLDING GEAR AND OTHER WHEELS.
No. 248,302. Patented Oct. 18, 1881.
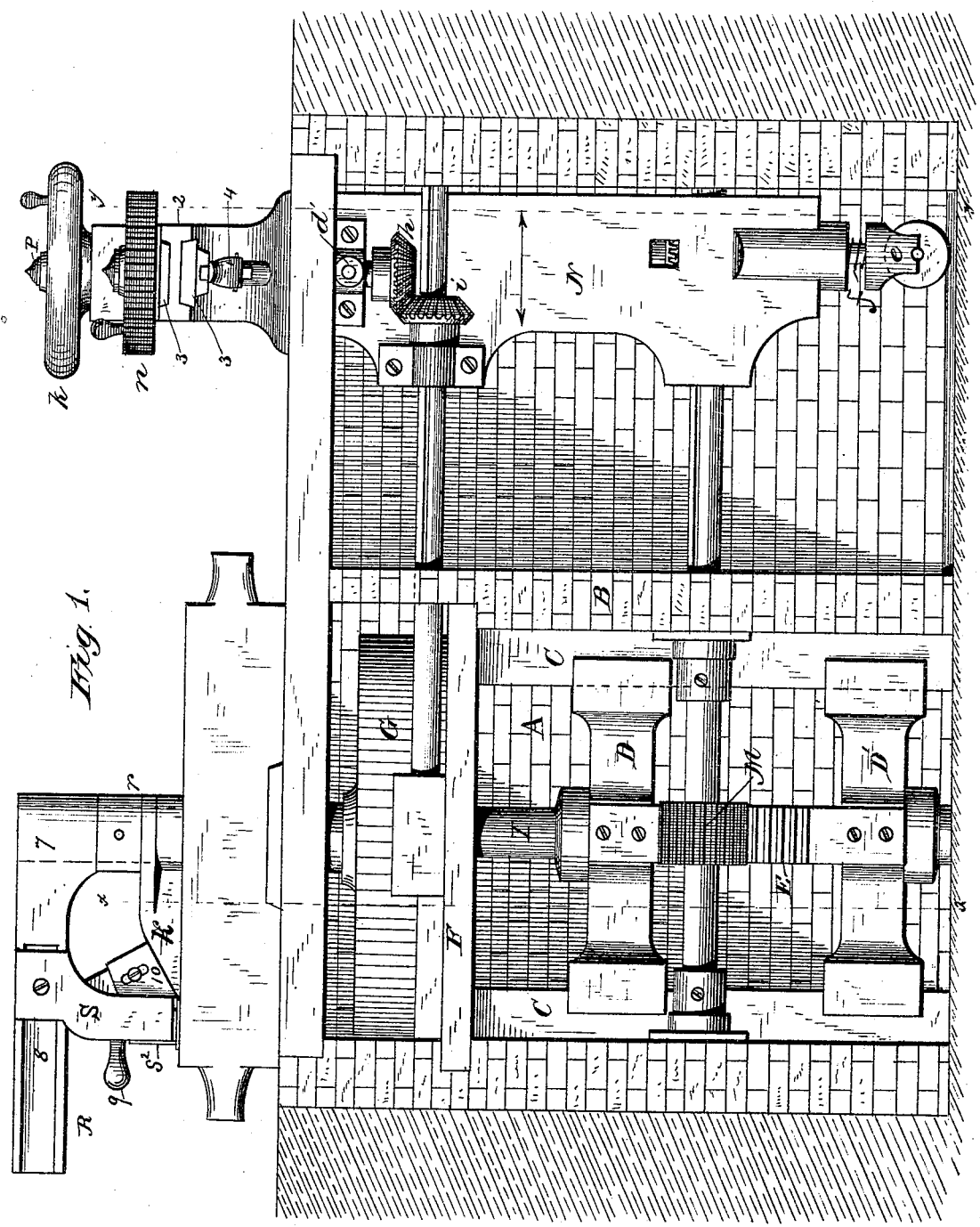
Witnesses:
Franck L. Ourand
J. M. Yznaga
Inventor
W. N. Gartside
by Heylmun & Kane
Attorneys.

(Model.)
W. N. GARTSIDE.
METHOD OF AND APPARATUS FOR MOLDING GEAR AND OTHER WHEELS.
No. 248,302. Patented Oct. 18, 1881.
4 Sheets—Sheet 2.
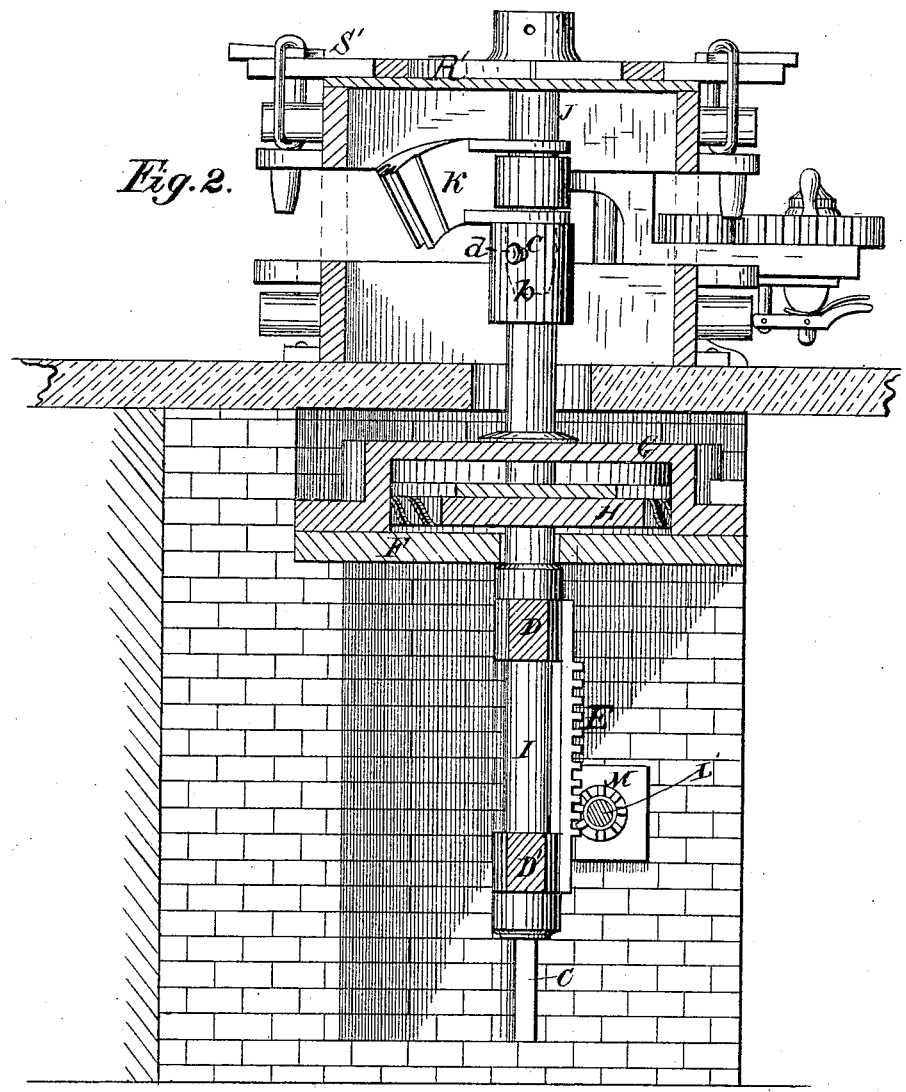
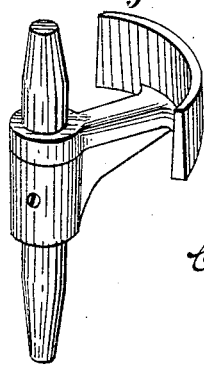
Witnesses
W. F. Morsell.
E. W. Johnson.
Inventor.
Wm. N. Gartside,
by Heylmun & Kane,
Attorneys.

(Model.)
W. N. GARTSIDE.
METHOD OF AND APPARATUS FOR MOLDING GEAR AND OTHER WHEELS.
No. 248,302. Patented Oct. 18, 1881.
4 Sheets—Sheet 3.
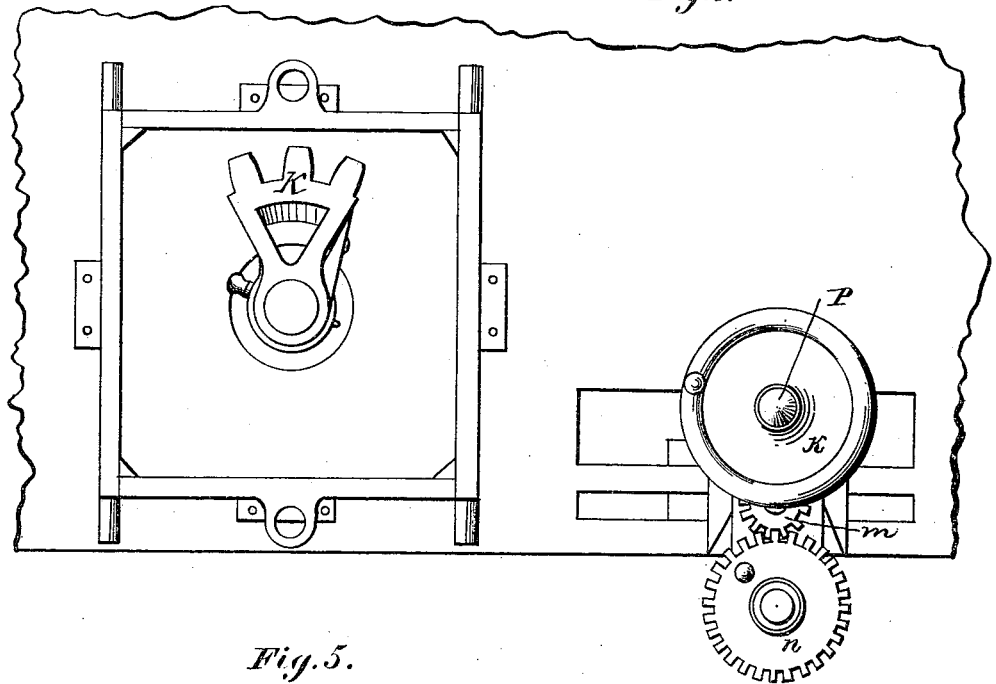
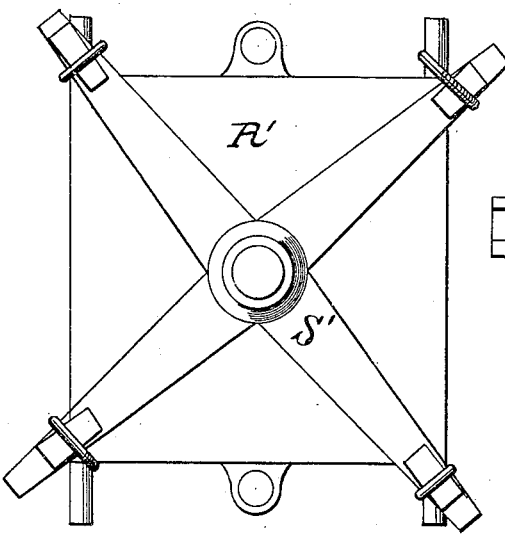
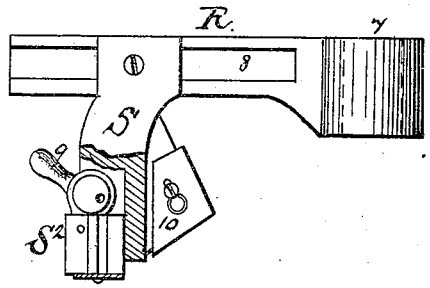
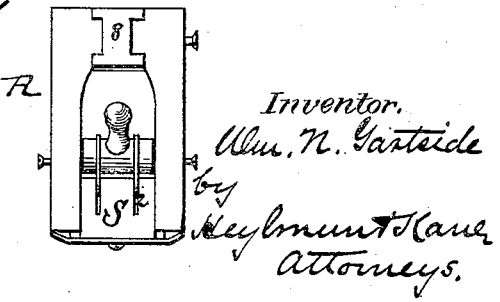
Witnesses
W. H. Morsell
E. W. Johnson
Inventor,
Wm. N. Gartside
by
Seymour & Kane
Attorneys.

(Model.)
W. N. GARTSIDE.
METHOD OF AND APPARATUS FOR MOLDING GEAR AND OTHER WHEELS.
No. 248,302. Patented Oct. 18, 1881.
4 Sheets—Sheet 4.
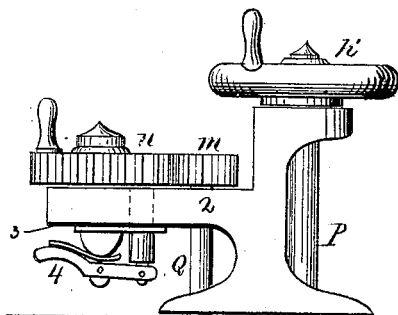
Fig. 4.
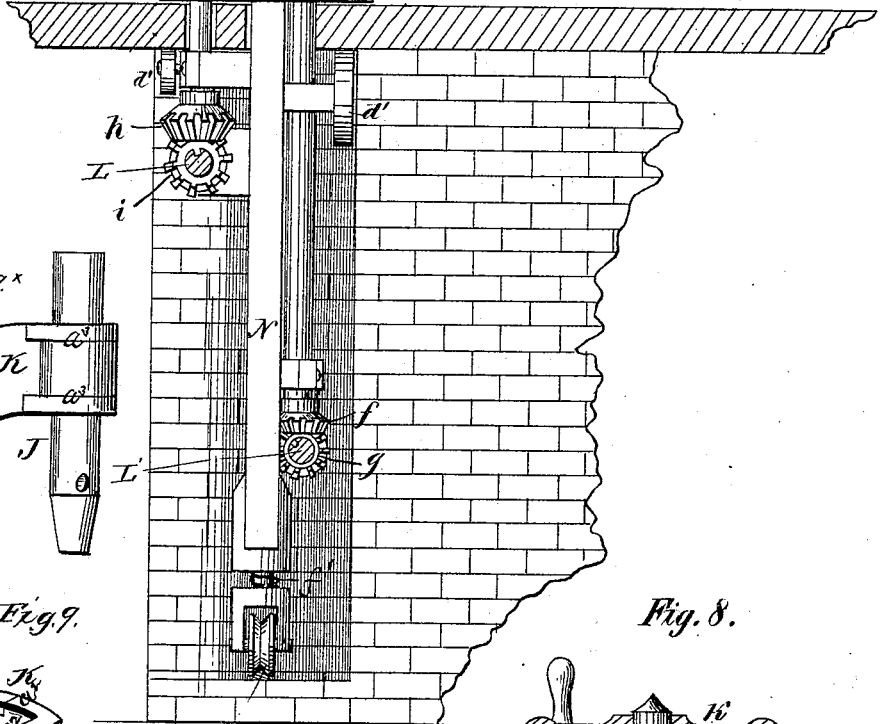
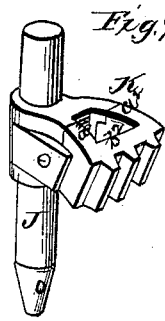
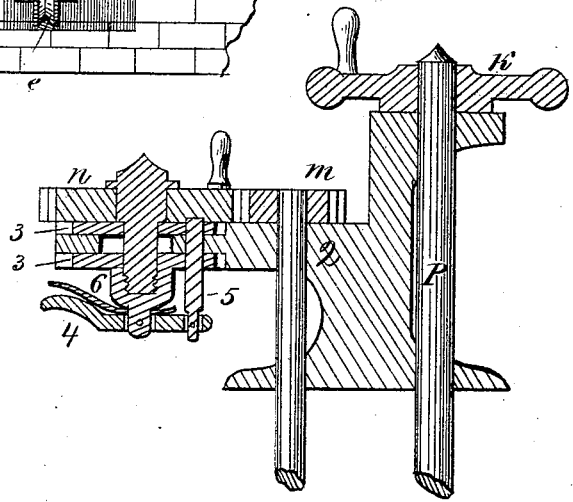
Fig. 8.
Witnesses.
W. F. Morsell
E. W. Johnson.
Inventor.
Wm. N. Gartside,
by Heylmun & Kane
Attorneys.
N. PETERS, Photo-Lithographer, Washington, D. C.

UNITED STATES PATENT OFFICE.

WILLIAM N. GARTSIDE, OF RICHMOND, INDIANA.

METHOD OF AND APPARATUS FOR MOLDING GEAR AND OTHER WHEELS.

SPECIFICATION forming part of Letters Patent No. 248,302, dated October 18, 1881.

Application filed July 30, 1881. (Model.)

*To all whom it may concern:*

Be it known that I, WILLIAM N. GARTSIDE, a citizen of the United States of America, residing at Richmond, in the county of Wayne and State of Indiana, have invented certain new and useful Improvements in Methods of and Means for Molding Gear and Similar Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the art of and to the means for molding gear-wheels and similar articles having a circular contour.

The invention consists in the art or method of molding gear and similar wheels, the same consisting in forming the drag portion of the mold in sections by means of a pattern-section, then arranging the cope over the drag, then raising the pattern-section into the cope and removing the cope with the pattern-section and its arbor, and finally forming the cope portion of the mold.

My invention further consists in the combination of a pattern-section of a wheel mounted on a vertical shaft with means arranged in a pit below the foundry-floor for imparting vertical and rotary motions to the pattern-section within the flask.

My invention further consists in the combination, with a pattern-section mounted on a vertical shaft, of lifting means arranged in a pit below the foundry-floor, and a mechanism in close proximity to the drag, and working in conjunction with the lifting means for raising the pattern-section from the mold of the drag.

My invention further consists in the combination, with a vertical shaft carrying a pattern-section at its upper end, and a flask arranged around the pattern, of gearing arranged below the flask for raising and lowering the pattern-section, and an adjustable carriage provided with means for operating the gearing below the flask.

My invention further consists in the combination, with a flask and a pattern-section arranged within the flask, of a sliding carriage with operating gearing arranged in a pit below the surface of the foundry-floor, for giving vertical and rotary motions to the pattern-section, and means for holding the pattern-section in a fixed position.

My invention further consists in the combination, with two horizontal spline-shafts for operating the pattern-section, of an adjustable carriage provided with independent and separable gearing for imparting either vertical or rotary movement to the pattern-section.

My invention further consists in the combination, with means for imparting vertical and rotary motions to the pattern-section, of means for controlling and holding the pattern-section in a fixed position during the process of molding, as will be hereinafter more fully described.

My invention farther consists in the combination, with a vertical shaft carrying at its upper end a pattern-section, of a striking-off and ramming device mounted on said shaft above the pattern, so as to have a rotary motion, as will be hereinafter more fully set forth.

My invention further consists in the combination, with a vertical shaft carrying at its upper end a pattern-section, of an arm mounted on said shaft above the pattern, so as to have a rotary motion, provided with an adjustable sand-rammer operated by an eccentric lever.

My invention further consists in the novel construction and combination of parts, as will be hereinafter more fully set forth, and specifically claimed.

Figure 1 of the drawings is a representation of a front view, showing the pit with a portion of the operating mechanism arranged therein below the surface of the foundry-floor. Fig. 2 is a side-section view, taken through the line *x x* of Fig. 1, showing the cope with the vertical shaft and its pattern-section elevated for detachment. Fig. 3 is a plan view of the drag, the pattern-section, and the operating-wheel. Fig. 4 is a side view taken through the line *y y* of Fig. 1. Fig. 5 is a plan view of the cope with the bottom board, spider, and clamping devices. Fig. 6 is a side view of the sweep and sand-ramming devices. Fig. 7 is a front view of the sweep-arm, showing the rammer and lever. Fig. 8 is a sectional view, taken through the wheels *k m n* and their adjuncts. Fig. 9 is a perspective view of the pattern-section of a gear-wheel. Fig. 9˟ is a side view of the pattern-section. Fig. 10 is a perspective view of the pattern-section of a pulley.

In the drawings, A A′ represent a pit, constructed below the foundry-floor, and divided by a partition, B. Within the pit A are arranged the two vertical guideways, C C, suitably secured, extending from the bottom to nearly the top, as seen in Fig. 1 of the drawings.

The letters D D′ represent two cross-heads, connected together by means of a vertical rack, E, working upon the guideways C C. This part of the pit is divided transversely by means of the partition F, (see Figs. 1 and 2,) and supports a casing, G, within which is inclosed a worm-wheel, H.

Connected with the cross-heads D D′, carrying the rack E, is a vertical spline-shaft, I, and to this shaft is also connected the worm-wheel H. The upper end of this shaft I is provided with a collar, $b$, having a transverse aperture, $c$, to receive a coupling-pin to connect a shaft, hereinafter described.

The letter J represents the short section of a shaft having its lower end tapering, and provided with a transverse aperture to fit into a tapering recess in the collar $b$, located at the upper end of the shaft I, and to register with the transverse aperture thereof, so as to receive the coupling-pin $d$. To this shaft J is secured in any suitable manner the pattern-section K of a gear or other wheel to be molded or cast.

The letters L L′ (see Fig. 1) represent two horizontal shafts, arranged in different planes. To the lower shaft, L′, is secured the pinion M for engaging with the rack E of the cross-head for giving vertical movements to the vertical shaft I and its adjuncts, and to the shaft L is attached a worm-pinion, (not shown,) inclosed within the casing G, for communicating a rotary motion to the shaft and its pattern-section.

The letter N (see Figs. 1 and 4) represents a movable carriage or head, having at the bottom and top anti-friction wheels $d'$ and $e$, bearing against the upper and lower surfaces of the pit-section A′. The lower friction-wheel, $e$, is provided with a tension-spring, $f'$, and is preferably grooved, so as to work on the rail in cross-section, of the shape of an inverted V, to prevent lateral displacement of the head at this point, while the anti-friction wheels $d$ $d'$ (see Fig. 4) are arranged on opposite sides, so as to balance and maintain the carriage (at this point) even and steady. This head or carriage N is provided with two vertical shafts, P and Q, (see Figs. 4 and 8,) the former being provided with a beveled pinion, $f$, engaging with a similar pinion, $g$, feathered or splined to the shaft L′, and capable of moving with the carriage N, and to the lower end of the vertical shaft Q is arranged a bevel-pinion, $h$, engaging with a similarly-constructed pinion, $i$, arranged on the horizontal shaft L, but capable of sliding on the said shaft.

It will be observed that the pinions $f$, $g$, $h$, and $i$ are attached to the carriage N, so as to be moved therewith in its adjustment in the pit.

To the upper end of the shaft P of the carriage N is a hand-wheel, $k$, for operating the shaft I with its pattern-section through the instrumentality of the gearing $f$, $g$, M, and E.

To the upper end of shaft Q is a gear-wheel, $m$, and engaging with this is another pinion, $n$, but of a larger diameter, and provided with a handle for communicating rotary motion to the vertical shaft I and its pattern-section through the instrumentality of the bevel-pinion $h$ $i$ and the worm-gearing. The bracket 2, affording bearings for the gear-wheels $m$ and $n$, (see Figs. 4 and 8,) is slotted and recessed to receive the plates or washers 3 3, which have a sliding motion therein and engage and disengage the pinion $n$ and the pinion $m$. The object of disengaging the pinion $n$ is to substitute pinions of larger or smaller diameter to make the proper divisions to suit the size of wheel being molded.

To the lower end of the arbor of pinion $n$ is pivoted a lever, 4, having at its outer end a vertical arm or dog, 5, with an interposed spring, 6, for locking the pinion $n$ in the desired position to prevent any further movement of the pattern-section mounted on shaft I during the process of ramming the sand about the same.

The object of having the carriage or head N adjustable with its attachments is to permit of the use of larger or smaller flasks upon the foundry-floor over the vertical shaft, and to have the operating mechanism within easy reach of the molder.

The letter R (see Figs. 6 and 7) represents the sweep-arm and rammer, consisting of the hub 7, the I-shaped arm 8, the rammer-arm S, with the rammer S², and the eccentric-lever 9 for operating the rammer S², and the adjustable inclined sweep 10. The office of the adjustable sweep-arm 10 is to strike off the surplus sand and level the sand in the mold for the operation of the rammer.

It will be observed by reference to Figs. 1 and 6 of the drawings that the ramming device, with the sweep-arm, is adjustable upon the I-shaped arm 8, so as to conform to molds of different sizes.

The method of molding a large gear-wheel is as follows: I first make a pattern-section of a gear-wheel to be cast, consisting of two arms, $a^2$, and a portion of the rim $b^2$, and to the upper and lower faces of the arms at the inner part I attach two plates, $a^3$, provided with holes corresponding in diameter to that of the shaft J. I then place a wooden shaft with centers through the plates, which gives me the center of the wheel. I then lay or step off the teeth to the proper pitch, and then run the shaft or center through, and obtain, by drawing lines and measurement from center to rim, the radial center of each tooth, thus getting the teeth correct in position. After the pattern-section of the gear-wheel is finished and polished for drawing from the sand, it is secured to the shaft J in any suitable manner, after being adjusted to the proper height. The drag is now placed over the shaft and its pattern-section so as to rest on the foundry-floor. Then the head or carriage is adjusted toward the drag, so as to be within reach for operation. A collar, r, is then placed on the shaft J, above the pattern-section, and the sweep-arm and rammer R is adjusted on the shaft above the collar, so that the same may act in conjunction with the pattern-section. The sand is now shoveled into the drag in sufficient quantity, and the sweep-arm is revolved around the drag so as to make the desired parting, and the sand is rammed by adjusting the rammer over the pattern-section or work and operating the rammer vertically by means of the eccentric-lever. The ramming between the teeth of the pattern will depend upon the size of the wheel and space between the teeth of the spur-wheel; but in bevel-wheels the ramming between the teeth will be accomplished by hand-tools, on account of the angle-parting conforming to the upper molding-surface of the wheel, but in nearly all other instances the rammer can be used to an advantage. The hand-wheel k is now operated, which raises the pattern-section out of the sand, and while it is out the wheel n is turned about twice around, so as to move the pattern-section the proper distance. Then the wheel k is turned backward, which operation causes the vertical shaft to descend and the pattern to assume the new and proper position in the drag for molding another section of the wheel. This operation is continued until all the sections of the entire wheel have been molded, after which the sweep-arm and rammer are removed from the shaft. The cope is then arranged on the drag in the well-known way, and the bottom board, R', placed on top of the cope, over which is placed the spider S', and connected to the handles of the cope by means of clamp-springs and wedges, substantially as indicated in Fig. 2.

The hub portion of the spider is made fast to the detachable shaft J by means of a set-screw. The hand-wheel k is operated, which causes the shaft I, with its pattern-section, to be raised in the manner substantially as seen in Fig. 2 of the drawings. The connecting-pin d is removed, and the cope lifted a little higher, so as to completely raise the shaft, with pattern-section, above the socket collar, and the cope is then turned over and filled with sand, and the sweep-arm and rammer fitted on the other end of shaft J, so as to be used in substantially the same manner as in the drag.

In the foregoing description it will be noticed that the cope is prepared by the machinery in substantially the same way as the preparation of the drag is accomplished. The cope during the operation rests on timbers laid across the top of the drag to preserve the mold below from damage; but the cope may be prepared as suits the character of the work, or the convenience of the workman, on the floor of the foundry. After the cope has been molded the shaft J, with its pattern-section, and the spider S' and the bottom board, are removed, and the cope, with gate-holes placed back upon the drag and the mold, is ready for casting. After the mold is closed—that is to say, the drag and cope arranged in their proper order—they can be moved from the molding place to some other part of the foundry, and another wheel molded.

The advantages accruing by arranging the machinery in the pit for operating the pattern-section in the drag, and raising the same in cope off the drag, are:

First, the floor of the foundry is not crowded or otherwise incommoded by the presence of machinery.

Second, both the machinery and workmen are protected, the former by a substantial covering from the sand and dust, and the latter are in no danger of being injured by the movement of the mechanism.

Third, the prepared drag and cope can be readily moved to the truck, or carried to the positions desired on the foundry-floor without extra lifting or lowering.

Fourth, with the machinery above the floor the drag and cope must still be above the machinery, necessitating the building of intermediate structures or means for holding them and the workmen, which entail additional expense, and are of little utility.

It is obvious that large pulleys and other classes of articles besides gear-wheels and bevel-pinions having a circular contour may be made by the means hereinbefore described.

I wish to be distinctly understood that I do not wish to confine myself to the specific construction and arrangement herein described and shown, since they are capable of variation without departing from the spirit of my invention.

Having thus described my invention, what I claim as new, and desire to secure by Letters Patent, is—

1. The improvement in the art of molding gear and similar wheels which consists in forming the drag portion of the mold in sections by means of a pattern-section, then arranging the cope over the drag, then raising the pattern-section into the cope and removing the cope with the pattern-section and its arbor and finally forming the cope portion of the mold, substantially as described.

2. In a machine for molding gear and similar wheels, the combination of a pattern-section of a wheel mounted on a vertical shaft and means arranged in a pit below the foundry-floor for imparting vertical and rotary motions to the pattern-section within the flask, substantially as described.

3. In a machine for molding gear and similar wheels, the combination, with a pattern-section mounted on a vertical shaft, of lifting means arranged in a pit below the foundry-floor and a mechanism in close proximity to the drag, and working in conjunction with the lifting means for raising the pattern-section from the mold of the drag, substantially as described.

4. In a machine for molding gear and similar wheels, the combination, with a vertical shaft carrying a pattern-section at its upper end and a flask arranged around the pattern, of gearing arranged below the flask for raising and lowering the pattern-section, and an adjustable carriage provided with means for operating the gearing below the flask, substantially as described.

5. In a means for molding gear and similar wheels, the combination, with a flask and a pattern-section arranged within the flask, of a sliding carriage with operating gearing arranged in a pit below the surface of the foundry-floor, for giving vertical and rotary motions to the pattern-section, and means for holding the pattern-section in a fixed position, substantially as described.

6. In an apparatus for molding gear and similar wheels, the combination, with the horizontal spline-shafts L L', for operating the pattern-section, of an adjustable carriage provided with independent and separable gearing for imparting either vertical or rotary movement to the pattern-section, substantially as described.

7. In a means for molding gear and similar wheels, the combination, with a vertical shaft, I, carrying at its upper end a pattern-section of a wheel and cross-heads, D D', with rack E, horizontal shaft L', with pinion M, mounted thereon and engaging with rack E, of the cross-heads arranged in a pit below the foundry-floor and an operating mechanism arranged above the foundry-floor and within reach of the mold, substantially as and for the purpose set forth.

8. In a means for molding gear and similar wheels, the combination of the shaft I with pattern-section K, and the cross-heads D D' with rack E, guideways C C, horizontal shafts L and L', with their gearing, and the operating-wheels $k$, $m$, and $n$, substantially as described.

9. In an apparatus for molding gear and similar wheels, the combination, with means for imparting vertical and rotary motions to the pattern-sections, of a means for controlling and holding the pattern-section in a fixed position during the process of molding, consisting of the gear $m$ $n$, lever 4, and locking-pin 5, substantially as described.

10. In an apparatus for molding gear and similar wheels, the combination, with a vertical shaft, I, provided at its upper end with socketed collar $b$, of the detachable shaft-section J, having a tapering end to fit the socket of the collar $b$ of shaft I, and carrying the pattern-section, substantially as described.

11. In an apparatus for molding gear and similar wheels, the combination, with a vertical shaft carrying at its upper end a pattern-section, of a striking off and ramming device mounted on said shaft above the pattern, so as to have a rotary motion for striking or sweeping off the surplus sand and ramming the sand around the pattern, substantially as hereinbefore described.

12. In an apparatus for molding gear and similar wheels, the combination, with a vertical shaft carrying at its upper end a pattern-section, of a device mounted on said shaft above the pattern, so as to have a rotary motion therewith, provided with an adjustable rammer operated by an eccentric lever, substantially as described.

13. In an apparatus for molding gear and similar wheels, the combination, with a vertical shaft, of a detachable shaft-section, J, carrying the pattern-section and a ramming device.

14. In a means for molding gear and similar wheels, a cope provided with a bottom board, a spider with a central hub, and means for clamping the bottom board and spider to the cope, substantially as and for the purpose set forth.

15. In an apparatus for molding gear and similar wheels, the combination, with a vertically-movable pattern-section arranged in the drag of a flask, of a cope provided with a bottom board, spider, and clamping device, and the removable portion of the shaft carrying the pattern-section, substantially as and for the purposes set forth.

16. In an apparatus for molding gear and similar wheels, the combination of the movable carriage N, carrying journaled gearing $f$ $h$, the pattern elevating and lowering means composed, essentially, of cross-heads D D', rack E, and pinion M, and the intermediate splined shafts L L', with gearing, substantially as set forth.

17. In an apparatus for molding gear and similar wheels, the combination of the following organized instrumentalities: a vertical shaft with a detachable section at its upper end carrying the pattern-section; means for imparting vertical and rotary motions to the pattern-section; a means for controlling and holding the pattern-section in a fixed position during the process of molding, and an adjustable ramming device arranged on the shaft above the pattern-section, with the drag and cope, the latter provided with bottom board, spider, and clamping means, substantiatly as described.

In testimony whereof I affix my signature in presence of two witnesses.

WILLIAM N. GARTSIDE.

Witnesses:
S. C. WINDER,
W. D. RINEHART.